United States Patent [19]

Gianni

[11] Patent Number: 5,958,057
[45] Date of Patent: Sep. 28, 1999

[54] METHOD AND APPARATUS FOR POWERING-ON A COMPUTER-BASED SYSTEM VIA A NETWORK INTERFACE

[75] Inventor: Robert R. Gianni, San Jose, Calif.

[73] Assignee: Sun Microsystems, Inc., Mountain View, Calif.

[21] Appl. No.: 09/152,634

[22] Filed: Sep. 14, 1998

Related U.S. Application Data

[63] Continuation of application No. 08/499,085, Jul. 6, 1995, Pat. No. 5,809,313.

[51] Int. Cl.$^6$ ........................................... G06F 1/26
[52] U.S. Cl. ................................... 713/310; 713/300
[58] Field of Search ................ 395/750.01–750.08, 395/750

[56] References Cited

U.S. PATENT DOCUMENTS

| | | | |
|---|---|---|---|
| 4,635,195 | 1/1987 | Jeppesen, II et al. | 395/750 |
| 4,663,539 | 5/1987 | Sharp et al. | 395/750 |
| 4,663,563 | 5/1987 | Sharp et al. | 307/38 |
| 4,677,566 | 6/1987 | Whittaker et al. | 395/750 |
| 4,747,041 | 5/1988 | Engel et al. | 395/750 |
| 5,012,233 | 4/1991 | Paulsen, Jr. | 395/750 |
| 5,121,500 | 6/1992 | Arlington et al. | 395/750 |
| 5,121,506 | 6/1992 | Arlington et al. | 395/750 |
| 5,381,414 | 1/1995 | Gibson | 395/750 |
| 5,396,636 | 3/1995 | Gallagher et al. | 395/750 |
| 5,535,400 | 7/1996 | Belmont | 395/750 |

FOREIGN PATENT DOCUMENTS

| | | |
|---|---|---|
| 92302925 | 4/1992 | European Pat. Off. . |
| 92305570 | 6/1992 | European Pat. Off. . |
| 93304075 | 5/1993 | European Pat. Off. . |

*Primary Examiner*—Ayaz R. Sheikh
*Assistant Examiner*—David Wiley
*Attorney, Agent, or Firm*—Flehr Hohbach Test Albritton & Herbert LLP

[57] ABSTRACT

A network interface card in a networked client computer includes a network interface circuit that decodes and then compares incoming network packet addresses to known address bit patterns, the decoding and comparing circuitry being powered at all times. Receipt and recognition of certain addresses means the client computer must be powered-on, even if manually switched OFF. When such a server-transmitted address is recognized, a power-on signal is issued to a power control unit that causes full operating power to be coupled to the client computer. In this fashion, a server can broadcast power-on signals to a plurality of networked client computers or workstations.

20 Claims, 3 Drawing Sheets

METHOD AND APPARATUS FOR POWERING-ON A COMPUTER-BASED SYSTEM VIA A NETWORK INTERFACE

This is a continuation of application Ser. No. 08/499,085, filed Jul. 6, 1995, now U.S. Pat. No. 5,809,313.

FIELD OF THE INVENTION

The present invention relates to networked computer-based systems, and more specifically to powering-on such systems using network interface signals.

BACKGROUND OF THE INVENTION

A network is used to couple a host server computer to one or more client computers, using wires (including telephone wires), fiber optics, or wireless signals. There are at least several million computers in the United States alone, and an increasing number of these computers are becoming network-accessible.

FIG. 1 depicts a generic network 10 that includes a server 20 and one or more client computers or workstations 30, 30' that each include a central processing unit ("CPU") 40, 40'. (As used herein, the term computer shall be understood to include the term workstation.) The server and clients communicate over information paths 50, 50' that, as noted, may be wires, optical cables, or radio transmissions. Paths 50, 50' may be parallel, e.g., a plurality of wires, or may be serial, e.g., a single data line. At the client end, each computer includes a network interface circuit 60, 60'.

Network interface controller 60, 60' typically is an integrated circuit ("IC") chip that provides interfacing between the client computer and the remote host/server. According to current Ethernet network protocol, networked computers rely upon three attributes of the network: (a) the network is always up or active, (b) the client computer is always alive and coupled to the network, and (c) and/or application programs may be run locally or run remotely over the network from another computer. Each computer 30, 30' includes a power supply that is typically coupled to 110 VAC/220 VAC, and whose output DC voltages are coupled through an ON/OFF power switch relay, here depicted as a manually operated switch S1, or S1'. If the computer is to communicate with the network, the power switch is ON, otherwise there is no operating voltage to the computer. Although S1 is depicted as a manually operated switch, it is understood that power may be switched on or off using other switching devices, including electronic switching devices.

A single desktop computer such as computer 30 or 30' may only consume perhaps 150 watts of electrical power. However, cumulatively the electrical power consumed by all of the computers in the United States, and indeed in the world, is becoming appreciable. With a view to reducing this power consumption and the environmental cost involved in generating the power, the United States Federal Government has promulgated the Energy Star program.

As applicable to the present invention, the Energy Star program requires that computers be powered-off to a low energy state of less than 30 watts consumption during periods of inactivity. Computers meeting this requirement, so-called "green PCs", are permitted to bear an Energy Star insignia. Conversely, non-Energy Star compliant equipment is often less well received in the commercial marketplace.

One approach to complying with the Energy Star requirement is to design lower power consumption equipment, laptop computers, for example. Many computers can also benefit from advanced power management features, including features that are incorporated into the computer operating system. Intel Corp. and Microsoft Corp. collectively have promulgated one such Advanced Power Management specification.

Using power management, a computer can power-down its harddisk and slow its CPU clock rate, thus saving electrical power, after inactivity exceeding a certain threshold. Depressing a key on the computer keyboard, or moving a mouse or other control device will "awaken" the computer, restoring it to full CPU clock rate and/or reactivating the hard disk, within a few seconds.

However, powering-off a networked Energy Star compliant computer during periods of inactivity detrimentally interrupts established events that constantly occur in a networked computing environment, polling for example. In practice, powering-off a networked computer could readily make such a computer a pariah in the network marketplace. It is thus desirable to maintain some operating power, preferably less than 30 watts, to a networked computer to permit the computer to respond to the network without being manually awakened.

It is known in the art to remotely awaken a powered-off computer with a facsimile ("FAX") signal or a modem signal coupled to the computer's serial port from the telephone line. However such "awakening" requires a FAX or modem signal to be sent to the specific telephone number associated with the computer's modem. The modem must be powered at all times and may consume from 5 watts to 10 watts power.

Thus, there is a need to make a networked computer Energy Star complaint, without risk of interrupting network functions that can occur even during periods of client-system inactivity. Preferably the computer should be capable of being powered-off, and then "awakened" using only signals available from the network and coupled to the network interface card. Further, there is a need for a mechanism or system by which a large number of networked computers can be powered-on, quickly or even simultaneously.

The present invention discloses a method and apparatus for accomplishing these needs.

SUMMARY OF THE INVENTION

A network interface card in a networked client computer includes a software or hardware mechanism that is powered at all times. This mechanism decodes incoming network packets and recognizes therein a server-transmitted address whose receipt means the client must be powered-on, even if it had been manually switched off. The transmitted address may be a "broadcast" address whose receipt will cause power-on of all recipient client computers on the network. This address may instead be a client-dedicated address whose receipt will cause power-on only in client computers whose decode and recognition mechanism recognizes this address.

Within the network interface card, the address comparison may be implemented in hardware using register comparator logic, or in software using a hashing algorithm. In either event, the decoding and address recognizing mechanism operates with less than 30 watts power and is powered at all times.

Upon receipt, decoding and recognition of a broadcast or client address, the decode and recognition mechanism outputs a signal that activates a power control circuit within the network interface card. The power control circuit is coupled between the DC power source and the client, and activation closes this circuit, bringing full operating DC voltage and thus full power-on to the client.

Full power-on condition will occur within a few seconds, regardless of whether the client computer was in a power-off mode or was switched off manually. The present invention permits a server to broadcast a power-on address whose receipt will cause each of a plurality of clients coupled to the network to power-on simultaneously.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
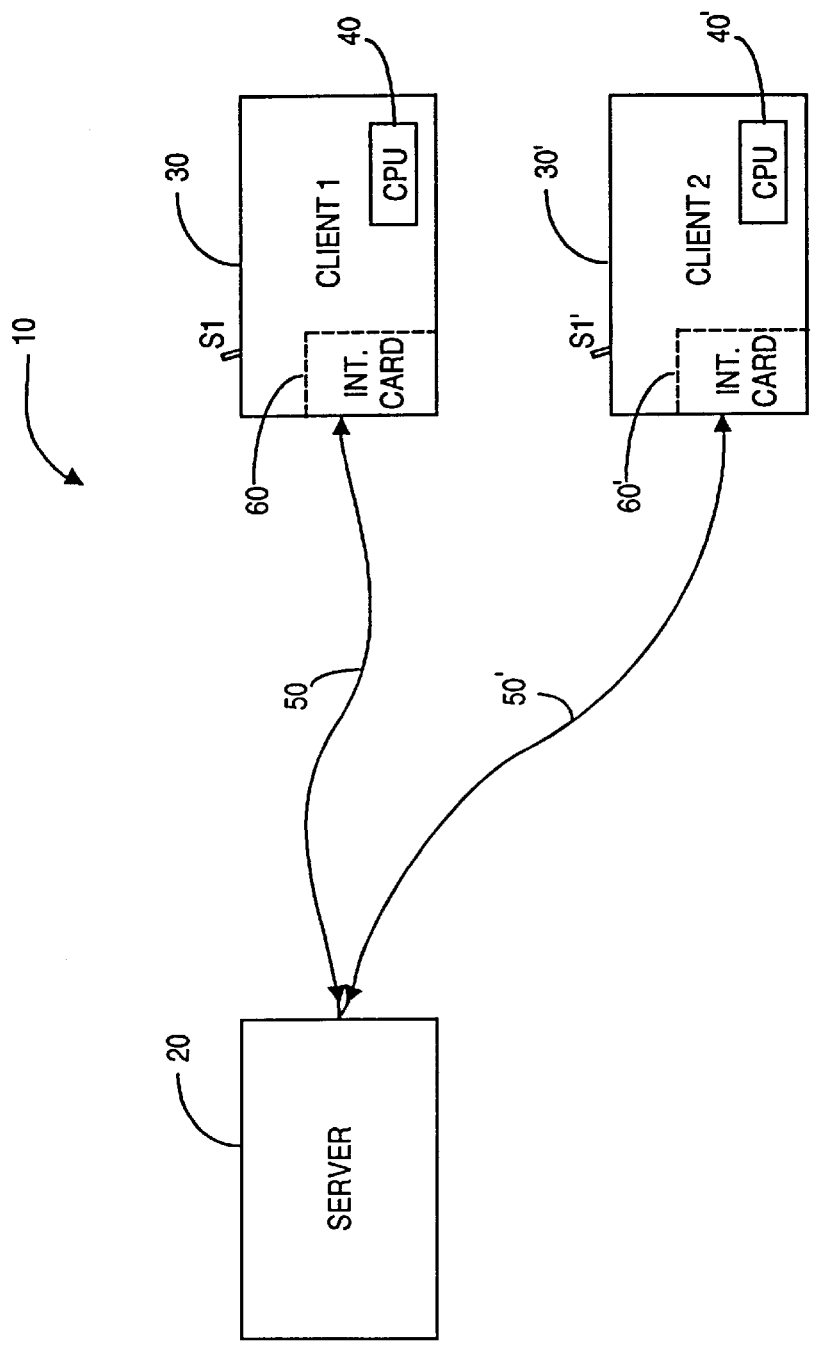
FIG. 1 depicts a generic network, according to the prior art.
Figure 2:
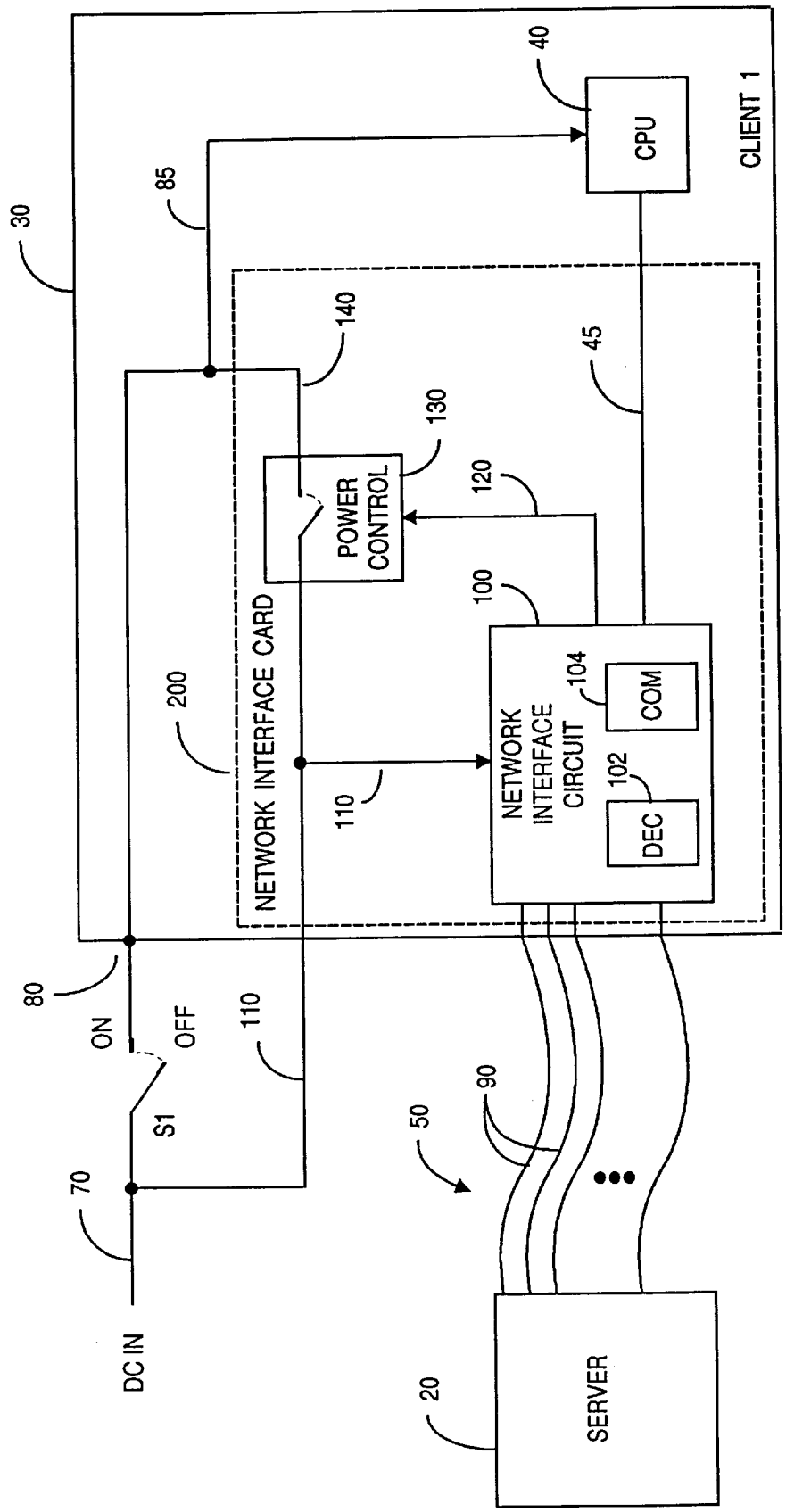
FIG. 2 is a block diagram of a portion of a network interface card and power control circuitry, according to the present invention.

FIG. 2 depicts a client computer (or workstation) 30 that includes a CPU 40, and a modified network interface card 200 according to the present invention. Computer 30 is coupled, via line or lines 50 to a network server 20, such as server 20 in FIG. 1.

Among line(s) 50 are line(s) 90 that can carry packets of information broadcast by server 20 to all client computers 30, 30', etc. coupled to the network. Although FIG. 2 depicts path 50 as including a plurality of lines including lines 90, e.g., parallel coupling, a single serial line (e.g., a single line 50 or line 90) configuration could instead be used, depending upon the network electrical specification.

The information broadcast by server 20 over line(s) 50 is in packet format, with each packet comprising a number of bytes. Packet size may be 48 bytes in certain protocols, each packet including an address field of 6 bytes, or 48 bits. In some protocols, the first 24 bits of an address field are organization address blocks, which contain bit patterns unique to the organization producing the hardware. Some organization address blocks are defined on an industry-wide basis. For example, within the IEEE Ethernet protocol, a string of 24 0's denotes a null packet, which recipient clients may ignore.

As described below, the present invention utilizes client receipt and recognition of certain server-transmitted address patterns to command power-on within a recipient networked client, even if the client had been manually turned-off.

Referring to FIG. 2, DC operating power to computer 30 is provided by an internal power supply (not shown) on line 70 that is coupled by a switch mechanism, here shown as a switch S1, into the computer at node 80. If switch S1 is in the OFF position, operating power to computer 30 is interrupted. However, a small amount of operating power is still coupled to at least a portion of a network interface circuit 100 via a power lead 110, and is also provided as an input to a power control circuit 130. Alternatively, a split power plane or a battery could be used to power the network interface circuit 100. Circuit 100 is powered at all times and will consume less than the 30 watts mandated by the Energy Star program. Actual circuit 100 power consumption depends upon the nature of the server-to-client coupling but will typically range from 5 watts to 10 watts.

If switch S1 is in the ON position, computer 30 receives full operating power, with CPU 40 being coupled via lead 85 to powered node 80. However, computer 30 may enter energy saving modes in which the computer hard disk (not shown) ceases rotation, and in which CPU 40 is clocked at a relatively slower rate, or completely halted.

It is to be understood that full operating power need not pass through switch S1, and that node 80 may in fact be the input node of a latch device within computer 30. Upon receipt of a DC signal at node 80, such latch device can switch the full operating power on to power computer 30.

Network interface circuit 100 is coupled by line (or lines) 90 to server 20, and to client CPU 40 by the local CPU data bus 45. Operating power is always available to circuit 100 via a power lead 110 that comes from the power source side of switch S1.

Circuit 100 includes an address decoder 102 and a comparator 104 that compares the decoding incoming address received via line(s) 90 against a stored bit pattern representing an address whose receipt means computer 30 should enter power-on. The comparator could, for example, include logic allowing a user of computer 30 to program not only the addresses to be recognized, but also to determine whether power-on should occur even if recognition is made. At a minimum, the portion of circuit 100 including decoder 102 and comparator 104 receive operating power at all times, but the rest of circuit 100 need not be powered at all times. Of course several such address bit patterns may be stored, including for example, a broadcast address pattern and a client address pattern.

Comparator 104 may be implemented in hardware using conventional hardware registers and comparator logic. Alternatively, comparator 104 may be implemented in software to shorten comparison time and reduce cost of implementation and/or power consumption. In a software implementation, comparator 104 includes a hash table and will first compare most significant bit portions of an incoming packet address. A hashing algorithm is executed within the interface controller unit. If matched, less significant bit portions are compared until a complete broadcast or client address match is recognized.

However implemented, if unit 100 recognizes an address match, a "power-on" signal is coupled over lead 120 to the input of a power control unit 130 that is coupled in parallel across switch S1. Power control circuit 130 may be a single power control integrated circuit ("IC"), a MOSFET switch, or other latch-accomplishing mechanism.

Upon receipt of this signal, power control unit 130 "closes", coupling together power-carrying line 110 and line 70 with line 140. CPU 40 now receives operating voltage via lead 85, and computer 30 can enter a full power-up state within one or two seconds, even if S1 is open.

Thus, when server 20 broadcasts a address over line(s) 90 whose receipt and recognition by circuit 100 commands a power-on of computer 30, unit 100 triggers power control unit 130, which provides full operating power to computer 30. Power-on occurs regardless of whether computer 30 is in an Energy Star low-power mode (e.g., where S1 was in the ON position to power-on computer 30, but has been turned OFF as a result of Energy Star mechanisms), or is in a power-off mode (e.g., with S1 in the OFF position). In the low-power mode, although S1 will have been in the ON position, CPU 40, hard disk(s) (not shown) and other power consuming components within computer 30 will have entered power saving modes, e.g., operating and using less than 30 watts.

In the above fashion, one or a plurality of client computers 30 may be simultaneously forced to enter a power-on state using address information broadcast by a network server. This is in contrast to the prior art use of a telephone line and modem to dial a dedicated telephone number for a given computer to remotely command the computer to power-on.

Figure 3:
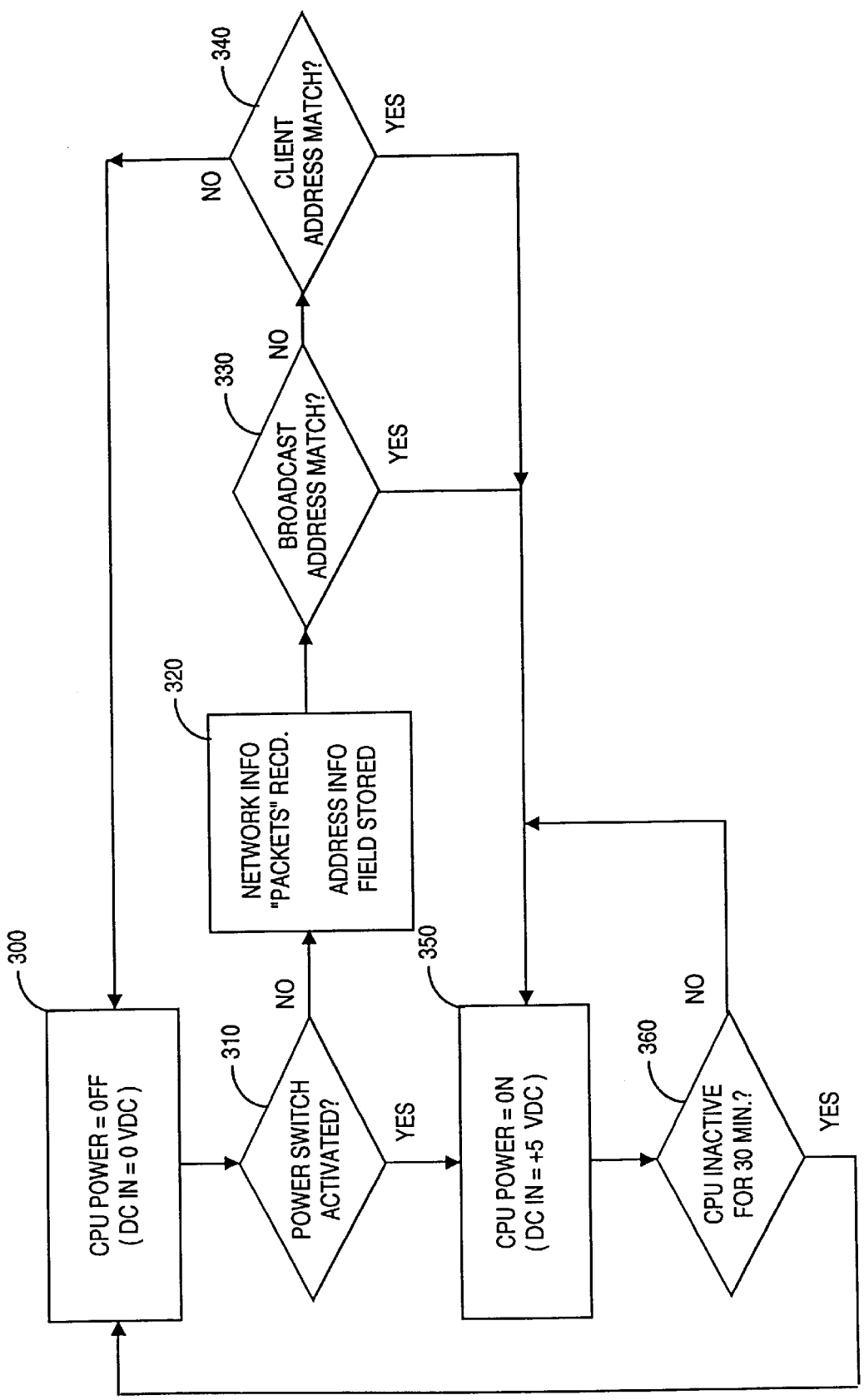
FIG. 3 is a flow diagram depicting steps in recognizing a network broadcast power-on indicating address, and in powering-on a networked client computer, according to the present invention.

FIG. 3 depicts the various method steps used to carry out the present invention. Initially, at method step 300, it is assumed that S1 is OFF, and that no DC operating potential is coupled to node 80 of computer 30.

At step 310, if switch S1 is ON (or activated), then at step 350 DC power is coupled to CPU 40 and indeed to computer 30. If, however, CPU 40 is inactive for 30 minutes as determined by step 360, Energy Star compliance mandates that, at step 300, CPU power be interrupted, e.g., S1 returned to OFF.

Returning to step 310, even if S1 is OFF, unit 100 receives operating power and examines incoming address information communicated over line(s) 90.

Within unit 100, if a comparison match is found between the incoming address and a bit pattern known to represent a broadcast address commanding a power-on condition, step 330 returns to step 350 and the CPU power is turned ON by activating power control unit 130 via line 120. However, as noted, user-programmable logic may be provided to override turn-on, even if a broadcast match occurs. As before, at step 360, after 30 minutes of inactivity, the Star Energy-compliant client will interrupt CPU power at step 300 by causing S1 to be OFF, and by power control unit 130 to open circuit.

However, if step 330 does not result in a broadcast address match, at step 340 a determination is made by unit 100 to determine whether the incoming address represents an address commanding a power-on condition of this particular computer 30.

If an address match occurs, then at step 350 power control unit is activated, providing operating DC voltage to computer 30. However, as noted, user-programmable logic may be provided to override power-on, even if a client address match occurs. Such logic could, if desired, flexibly permit a broadcast address match but not a client address match to cause power-on, or the converse.

If, however, step 340 does not recognize the incoming address, the routine returns to step 300 and computer 30 remains off.

Modifications and variations may be made to the disclosed embodiments without departing from the subject and spirit of the invention as defined by the following claims.

What is claimed is:

1. In a peer-to-peer environment that includes a plurality of members coupled to said environment including a member that broadcasts information to at least one member whose operating voltage is switched off, a method for powering-on the switched off member, the method including the following steps:

providing each said member with an interface coupled to receive said information, at least a portion of said interface receiving operating voltage at all times and including a decoder, a comparator, and a power control unit;

said decoder decoding a first type information included in said information;

said comparator comparing decoded said first type information with at least one stored information pattern representing a power-on condition, said comparator outputting a power-on signal to said power control unit when said stored information pattern matches the decoded said first type information;

said power control unit coupled to provide operating voltage to said switched off member upon receipt of said power-on signal.

2. The method of claim 1, wherein said interface stores at least a first information pattern representing a subset of members of said environment, and a second information pattern representing a subset of said subset of members of said environment;

wherein said comparator outputs said power-on signal when the decoded said first type information matches either of said first information pattern or said second information pattern.

3. The method of claim 1, wherein said member is Energy Star complaint, and wherein collectively said decoder and said comparator consume less than 30 watts of operating power.

4. The method of claim 1, wherein said environment further includes a second member, receiving said information broadcast by the broadcasting member, whose operating voltage is switched-off, said method powering-on each said member;

said second member including a second interface coupled to receive said information, at least a portion of said second network interface receiving operating voltage at all times, said interface including a second decoder, a second comparator, and a second power control unit;

said second decoder decoding said first type information included in said information;

said second comparator comparing decoded said first type information with at least one stored information pattern representing a power-on condition, said second comparator outputting a power-on signal to said second power control unit when said stored information pattern matches the decoded said first type information;

said second power control unit coupled to provide operating voltage to said second member upon receipt of said power-on signal;

wherein each member is powered-on simultaneously when said decoded said first type information matches said stored information pattern.

5. The method of claim 1, wherein said information includes packets of binary data.

6. The method of claim 1, wherein said first type information includes binary address information.

7. The method of claim 1, wherein said comparator includes a hashing algorithm executed within said interface.

8. In a peer-to-peer environment that includes a plurality of members coupled to said environment including one of said members that broadcasts information to at least a first member and a second member, each of said first and second member including an interface, at least of portion of which is operative at all times, each said interface able to store at least one type of information, and having a decoder that decodes at least one type of information, and having a power control unit controllably able to provide operating voltage to the associated said member, each of said first and second member having operating voltage switched off, a method for powering-on at least a chosen one of said first and said second member, the method including the following steps:

storing in each said interface at least one of a first type of information and a second type of information;

causing each said decoder to decode broadcast said information:

causing each said decoder to compare decoded said broadcast information against information stored in said decoder's associated said interface; and causing said each said power control unit to power-on each said member whose decoder comparison shows a match between information stored in said decoder's associated said interface said first type of information, wherein said first type of information when decoded and successfully compared commands powering-on.

9. The method of claim 8, wherein said first type of information pattern represents a subset of members of said environment, and said second type of information pattern represents a subset of said subset of members of said environment;

wherein each said comparator outputs said power-on signal when the decoded first type of information matches either of said first information pattern or said second information pattern.

10. The method of claim 8, wherein each said member is Energy Star complaint, and wherein collectively each said decoder and associated said comparator consume less than 30 watts of operating power.

11. The method of claim 8, wherein said information includes packets of binary data.

12. The method of claim 8, wherein said first type information includes binary address information.

13. The method of claim 8, wherein each said comparator includes a hashing algorithm executed within an associated said interface.

14. In a peer-to-peer environment that includes a plurality of members coupled to said environment and includes a member that broadcasts information to at least one of said members whose operating voltage is switched off, a system for powering-on a switched off said member, the system comprising:

an interface coupled to receive said information, said interface including a decoder, a comparator, and a power control unit, said decoder, comparator and power control unit each receiving operating voltage at all times;

decoder decoding at least a first type of information included in said information;

said comparator comparing decoded said first type information with at least one stored information pattern representing a power-on condition, said comparator outputting a power-on signal to said power control unit when a said stored information pattern matches the decoded said first type information;

said power control unit coupled to provide operating voltage to said switched off member upon receipt of said power-on signal.

15. The system of claim 14, wherein said interface stores at least a first information pattern representing a subset of members of said environment, and a second information pattern representing a subset of said subset of members of said environment;

wherein said comparator outputs said power-on signal when the decoded said first type of information matches either of said first information pattern or said second information pattern.

16. The system of claim 14, wherein each said member is Energy Star complaint, and wherein collectively for each interface said decoder and said comparator consume less than 30 watts of operating power.

17. The system of claim 13, wherein said environment further includes a second member, receiving said information broadcast by the broadcasting member, whose operating voltage is switched-off, said method powering-on each said member;

said second member including a second interface coupled to receive said information, at least a portion of said second network interface receiving operating voltage at all times, said second interface including a second decoder, a second comparator, and a second power control unit;

said second decoder decoding said first type information included in said information;

said second comparator comparing decoded said first type information with at least one stored information pattern representing a power-on condition, said second comparator outputting a power-on signal to said second power control unit when said stored information pattern matches the decoded said first type information;

said second power control unit coupled to provide operating voltage to said second member upon receipt of said power-on signal;

wherein each member is powered-on simultaneously when said decoded said first type information matches said stored information pattern.

18. The system of claim 14, wherein said information includes packets of digital data.

19. The system of claim 14, wherein said first type information includes binary address information.

20. The system of claim 14, wherein said comparator includes a hashing algorithm executed within said interface.

* * * * *

UNITED STATES PATENT AND TRADEMARK OFFICE
CERTIFICATE OF CORRECTION

PATENT NO. : 5,958,057
DATED : September 28, 1999
INVENTOR(S) : Gianni

It is certified that error appears in the above-identified patent and that said Letters Patent is hereby corrected as shown below:

Column 6, line 30, after "said" and before "interface including" insert therein --second--.

Column 7, line 44, before "decoder" insert therein --said--.

Signed and Sealed this

Fifteenth Day of August, 2000

Attest:

Q. TODD DICKINSON

Attesting Officer

Director of Patents and Trademarks